United States Patent
Park et al.

(10) Patent No.: US 11,466,133 B2
(45) Date of Patent: Oct. 11, 2022

(54) DISPLAY SUBSTRATE POLYIMIDE FILM

(71) Applicant: LG CHEM, LTD., Seoul (KR)

(72) Inventors: Jinyoung Park, Daejeon (KR); Danbi Choi, Daejeon (KR); Ye Ji Hong, Daejeon (KR)

(73) Assignee: LG CHEM, LTD., Seoul (KR)

(*) Notice: Subject to any disclaimer, the term of this patent is extended or adjusted under 35 U.S.C. 154(b) by 266 days.

(21) Appl. No.: 16/785,175

(22) Filed: Feb. 7, 2020

(65) Prior Publication Data

US 2020/0247968 A1 Aug. 6, 2020

Related U.S. Application Data

(63) Continuation-in-part of application No. PCT/KR2018/010607, filed on Sep. 11, 2018.

(30) Foreign Application Priority Data

Nov. 13, 2017 (KR) .................. 10-2017-0150726
Jul. 16, 2018 (KR) .................. 10-2018-0082241

(51) Int. Cl.
   *C08J 5/18* (2006.01)
   *C08G 73/10* (2006.01)

(52) U.S. Cl.
   CPC ............ *C08J 5/18* (2013.01); *C08G 73/1067* (2013.01); *C08J 2379/08* (2013.01)

(58) Field of Classification Search
   CPC ............ H01L 2251/5338; C08L 79/08; C08G 73/1042; C08J 5/18
   See application file for complete search history.

(56) References Cited

U.S. PATENT DOCUMENTS

| | | |
|---|---|---|
| 5,071,997 A | 12/1991 | Harris |
| 9,023,974 B2 | 5/2015 | Hasegawa |
| 9,024,312 B2 | 5/2015 | Fukuda et al. |
| 9,556,311 B2 | 1/2017 | Sohn et al. |
| 2009/0078453 A1 | 3/2009 | Jung |
| 2010/0047626 A1* | 2/2010 | Hitomi ............... G11B 5/4833 216/17 |
| 2012/0118616 A1 | 5/2012 | Saito et al. |
| 2012/0187399 A1* | 7/2012 | Fukuda ............... H01L 51/0097 257/43 |
| 2012/0287555 A1 | 11/2012 | Silvi et al. |

FOREIGN PATENT DOCUMENTS

| | | |
|---|---|---|
| CN | 102472966 A | 5/2012 |
| CN | 102576735 A | 7/2012 |
| JP | 2005-139433 A | 6/2005 |
| JP | 2009-518500 A | 5/2009 |
| JP | 2011-097007 A | 5/2011 |
| JP | 2011-138683 A | 7/2011 |
| JP | 2011-222779 A | 11/2011 |
| JP | 2013-014727 A | 1/2013 |
| JP | 2014-129464 A | 7/2014 |
| JP | 5746280 A | 5/2015 |
| KR | 10-1999-0080773 A | 11/1999 |
| KR | 10-2012-0100897 A | 9/2012 |
| KR | 10-2014-0012270 A | 2/2014 |
| KR | 10-2014-0034819 A | 3/2014 |
| TW | 201126723 A | 8/2011 |
| WO | 1991-001340 A1 | 2/1991 |
| WO | 2012/155083 A | 11/2012 |
| WO | 2014/129464 A1 | 8/2014 |

OTHER PUBLICATIONS

Search Report issued for European Patent Application No. 18 876 748.7 dated Dec. 9, 2020 7 pages.
Jou et al., "Simultaneous determination of the Biaxial Relaxation Modulus and Thermal Expansion Coefficient of Rigid-Rod Polyimide Films Using a Bending-Beam Technique", Macromolecules, 1992, 25, 179-184.
International Search Report issued for International Application No. PCT/KR2018/010607 dated Dec. 28, 2018, 4 pages.
T. P. Russell, "Concerning Voids in Polyimide", Polymer Engineering and Science, Mid-Apr. 1984, vol. 24, No. 5, pp. 345-349.

* cited by examiner

*Primary Examiner* — Gregory Listvoyb
(74) *Attorney, Agent, or Firm* — Rothwell, Figg, Ernst & Manbeck, P.C.

(57) ABSTRACT

The present invention provides a display substrate polyimide film having: remarkably improved insulation characteristics; inner pores, included in the polyimide film, of which the maximum size is 10 nm or less; and a high maximum dielectric breakdown voltage of 350 V/μm or more. The polyimide film according to the present invention has improved insulation characteristics so as to be capable of suppressing the generation of a current fluctuation of TFTs according to the long-term driving of a TFT device in a display such as an OLED, thereby enabling the deterioration of the contrast of a display to be reduced.

6 Claims, 7 Drawing Sheets

[FIG. 1]
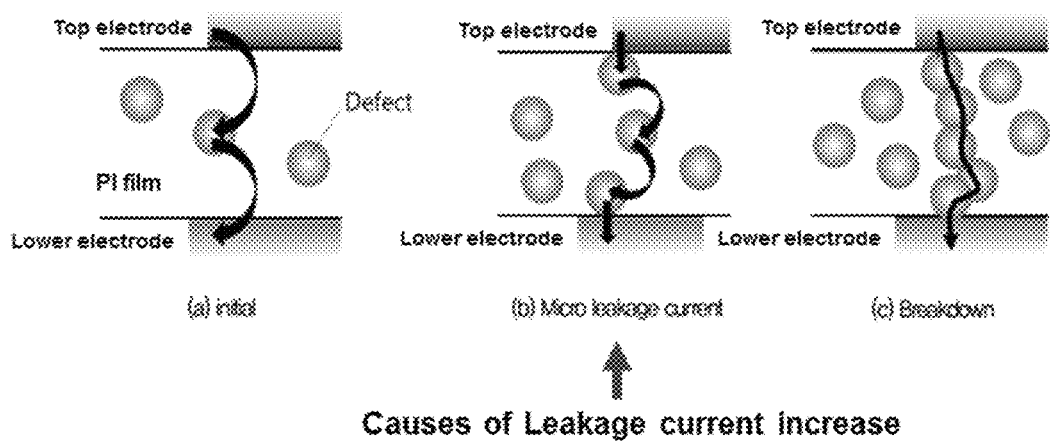
Causes of Leakage current increase
[FIG. 2]
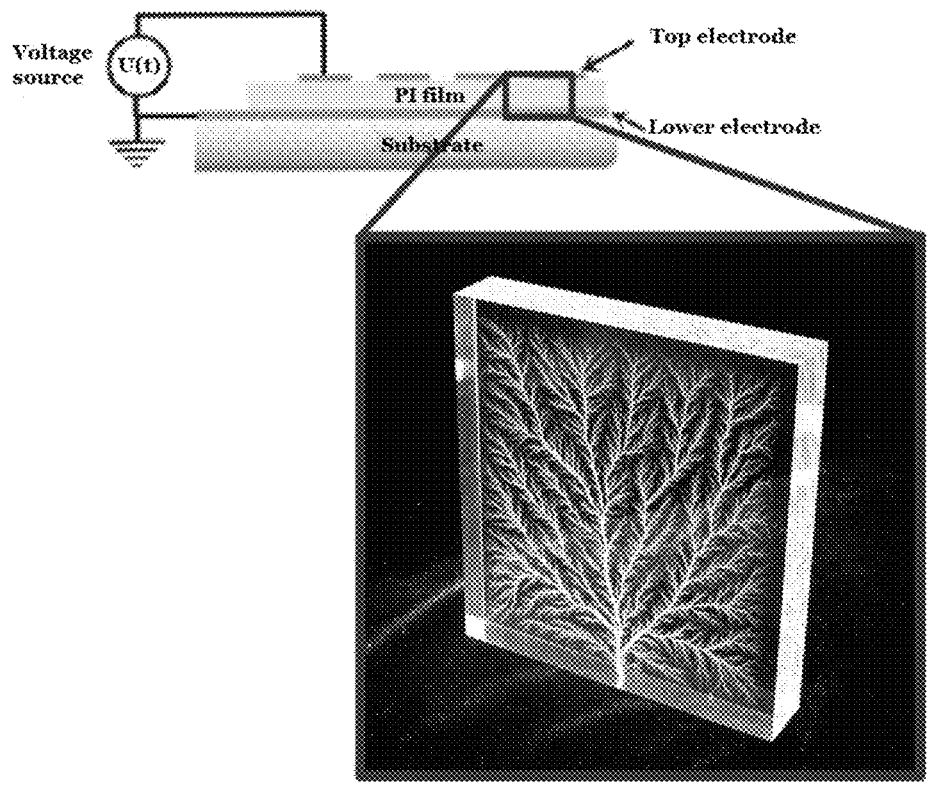
Dielectric breakdown within a solid insulator

[FIG. 3a]
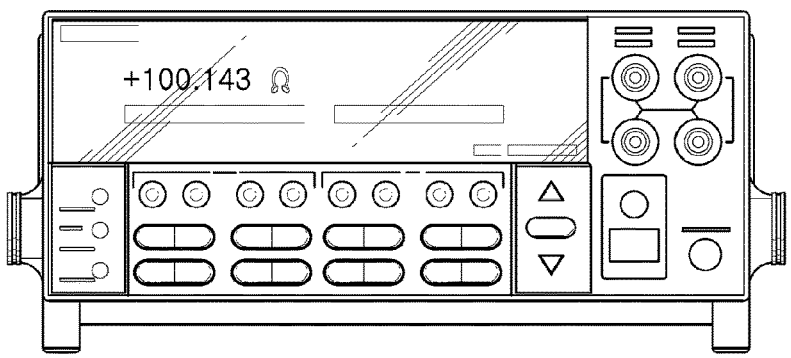
(Structure of high voltage source measurement)
[FIG. 3b]
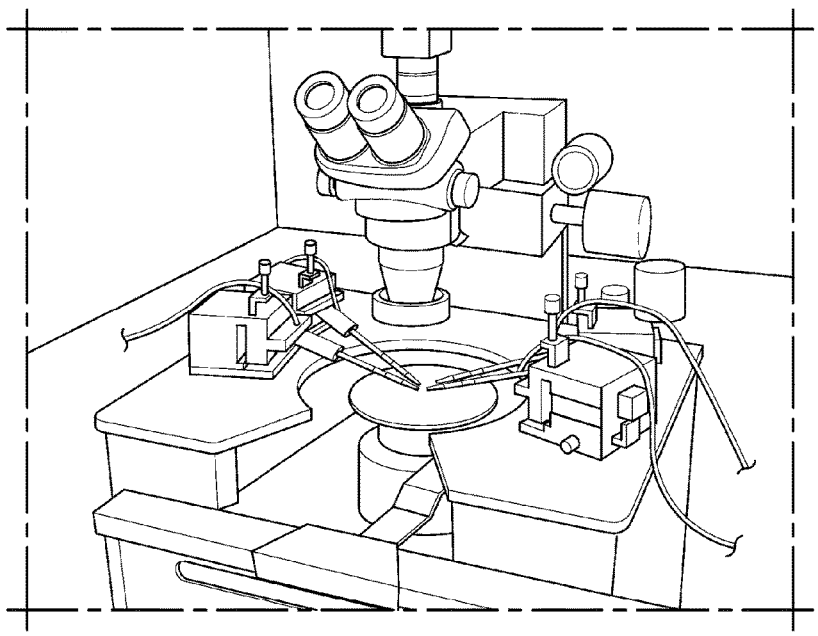
(Inside of probe station)
[FIG. 4]
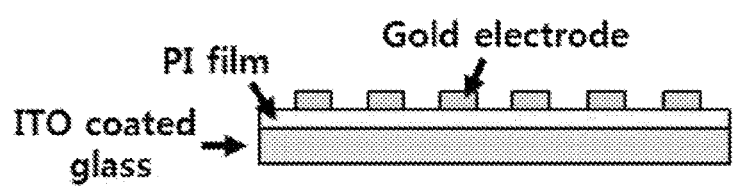
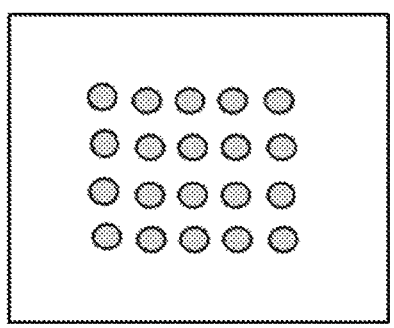

[FIG. 5a]
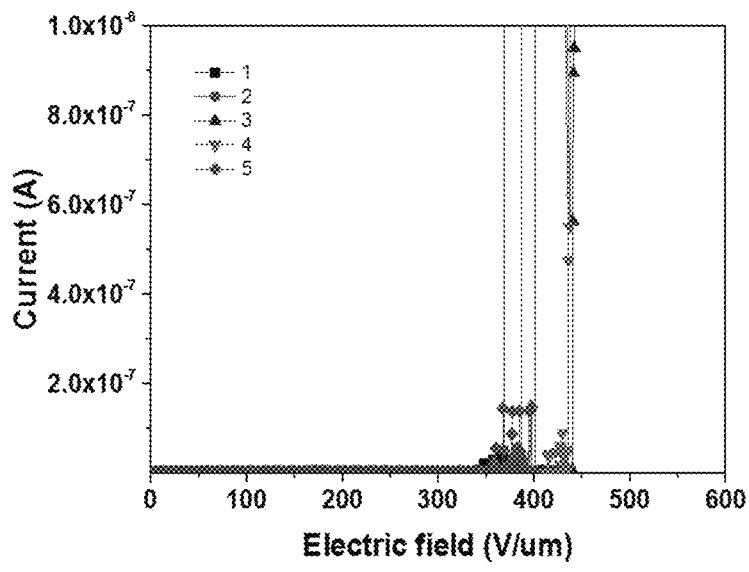
BV: 369 ~ 440 V/um
[FIG. 5b]
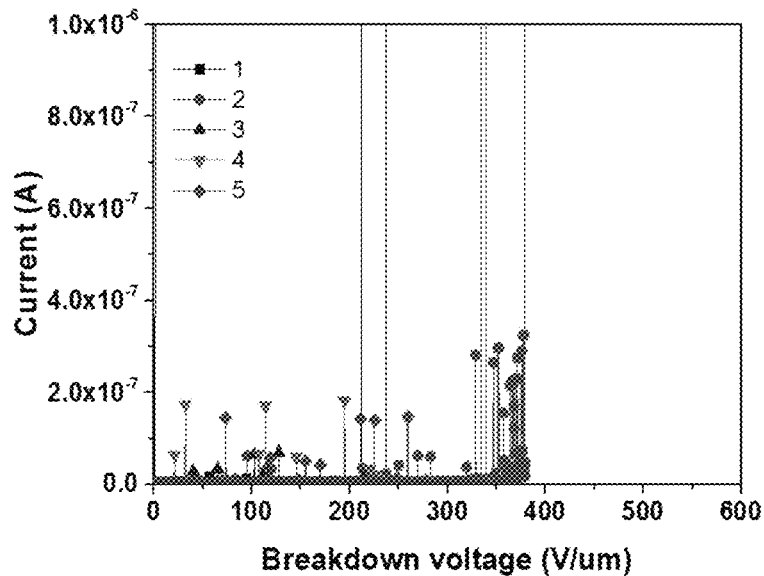
BV: 213 ~ 380 V/um

[FIG. 5c]
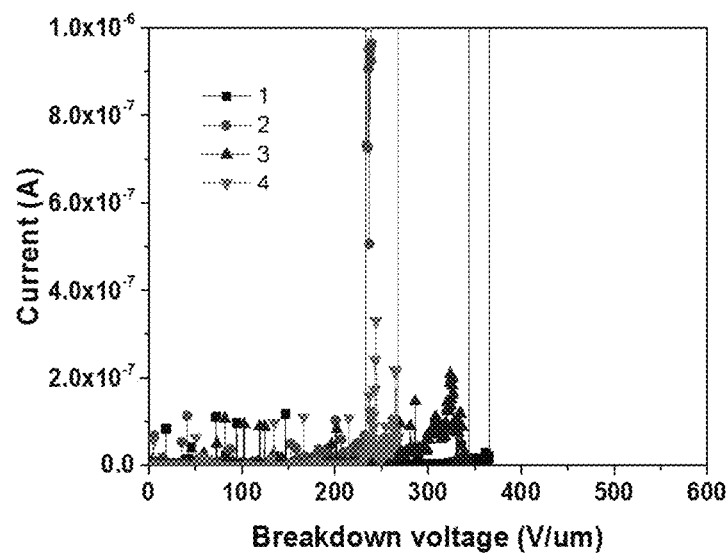
BV: 239 ~ 365 V/um
[FIG. 5d]
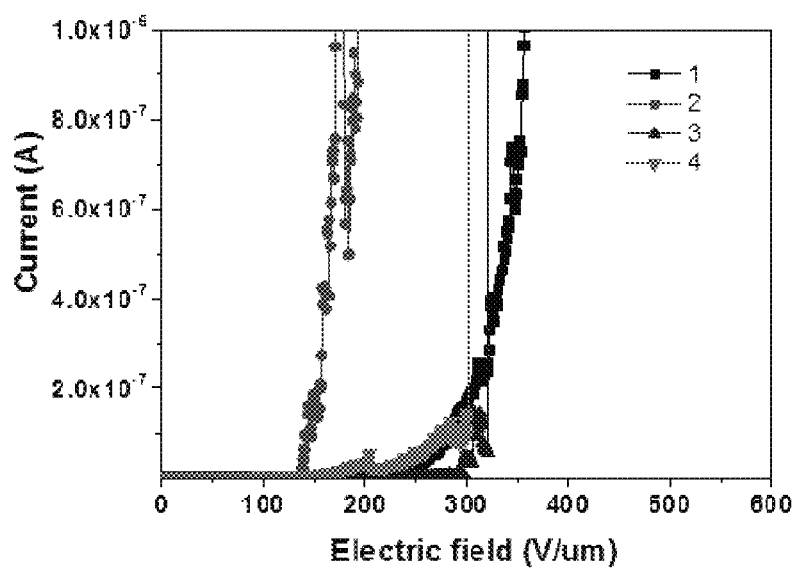
BV: 145~312 V/um

[FIG. 5e]
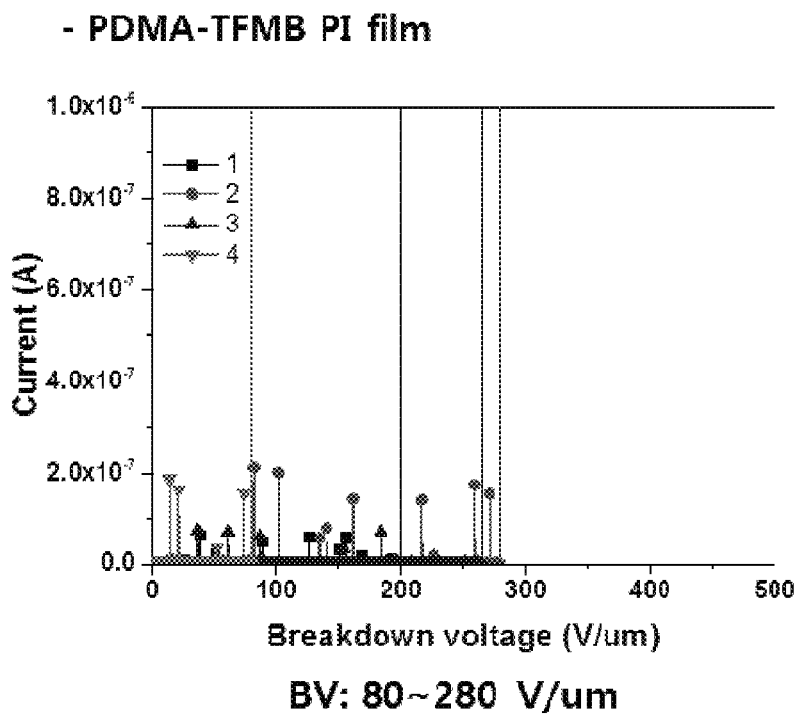
[FIG. 6a]
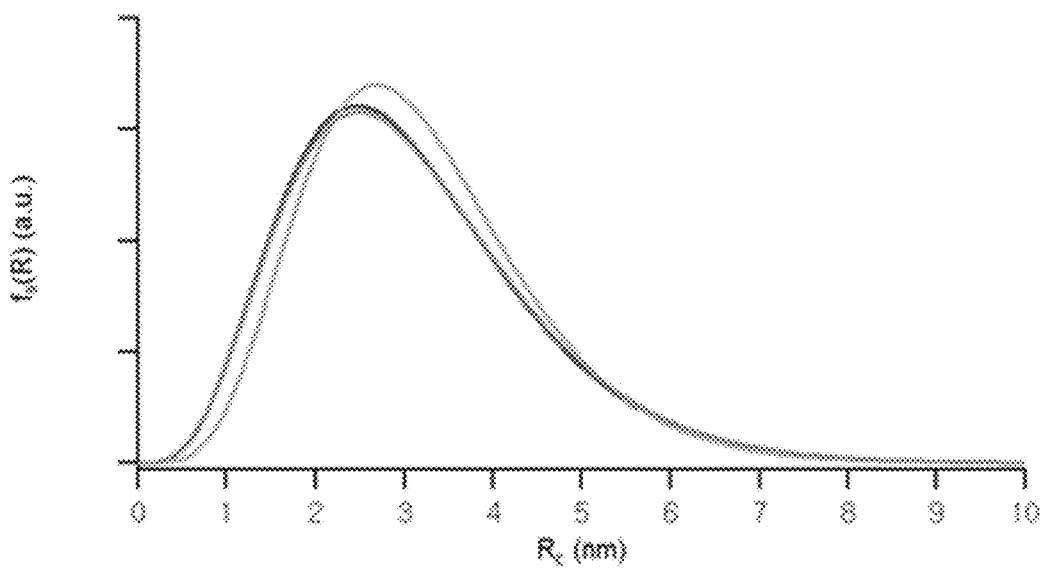

[FIG. 6b]
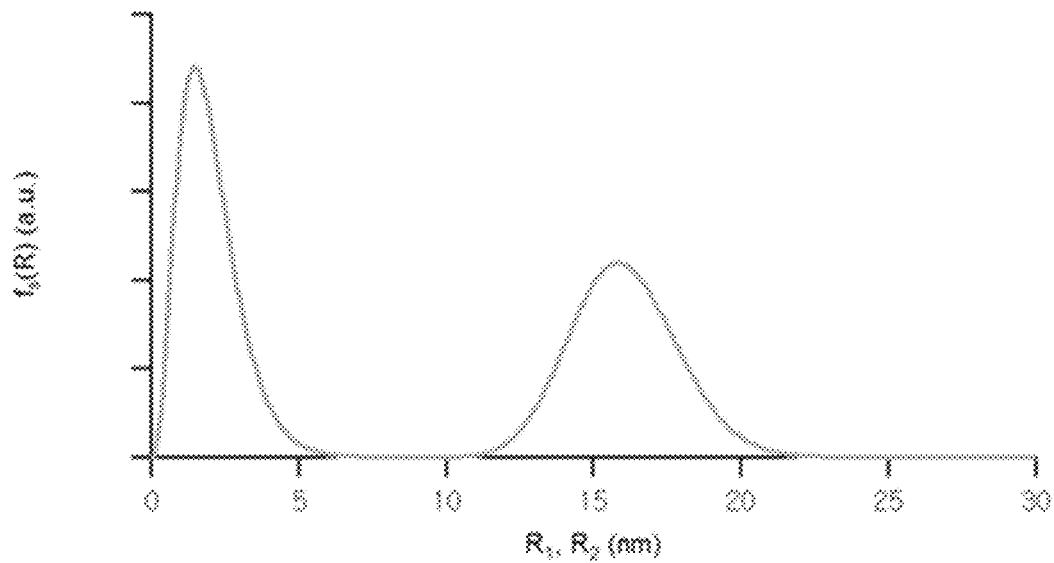
[FIG. 6c]
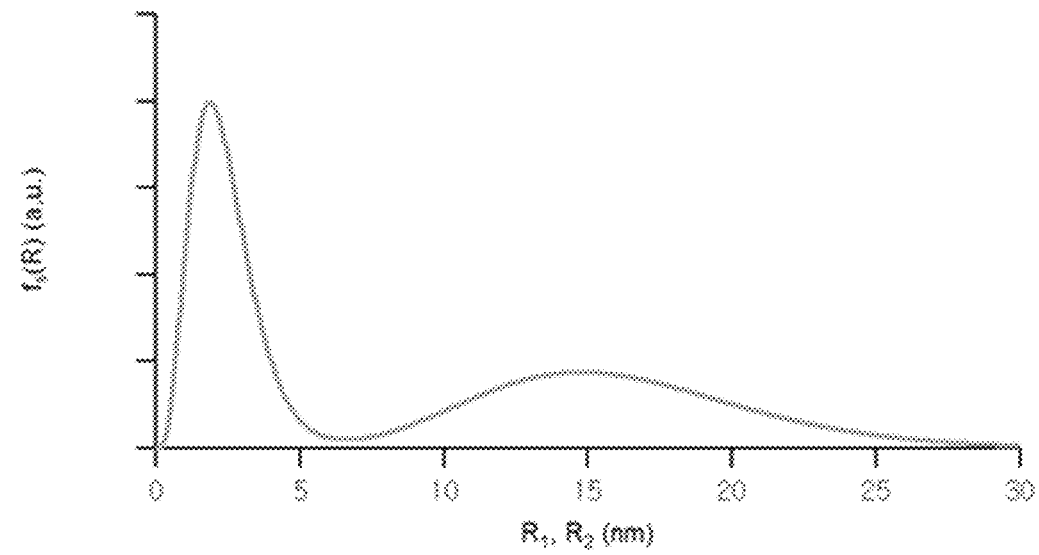

[FIG. 6d]
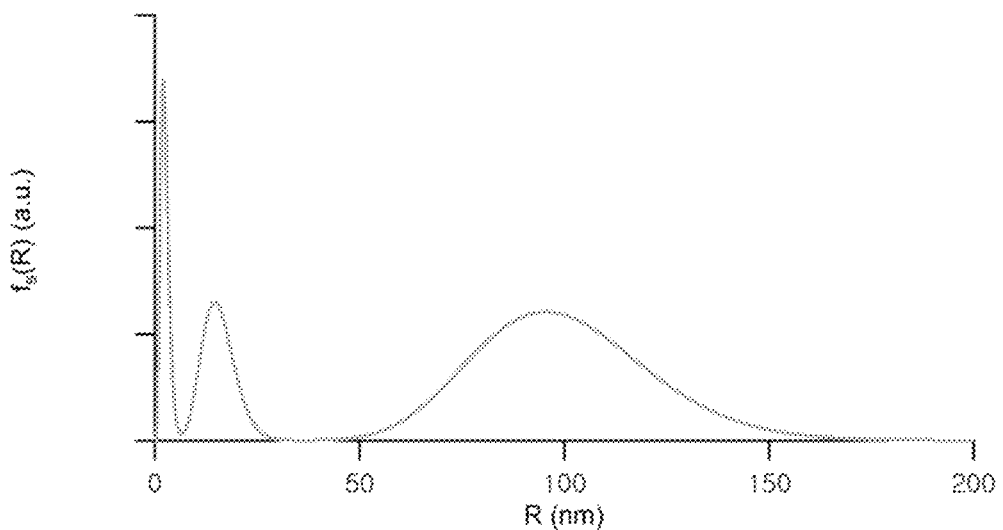
[FIG. 6e]
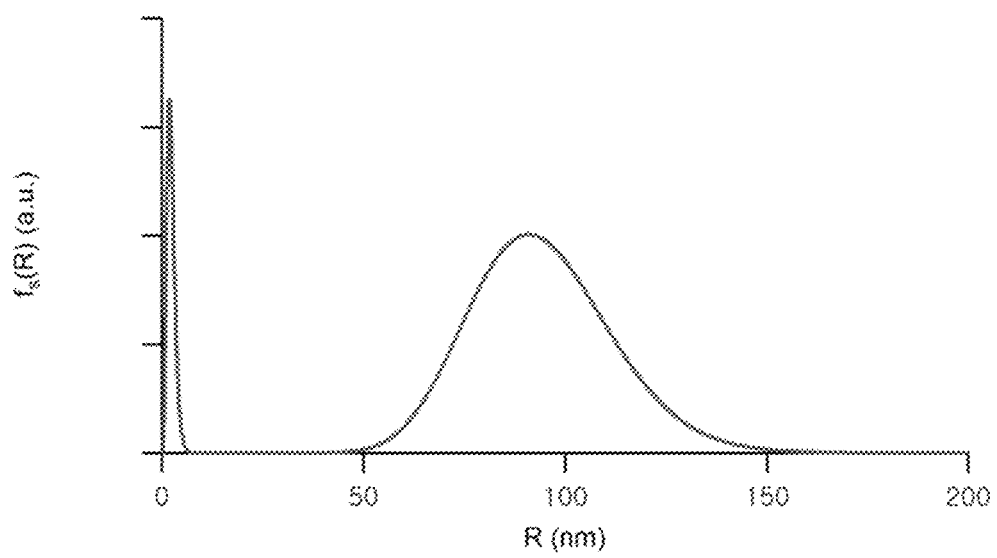

DISPLAY SUBSTRATE POLYIMIDE FILM

TECHNICAL FIELD

This application is a Continuation in part of International Application No. PCT/KR2018/010607, filed on Sep. 11, 2018, and designating the United States, which claims the benefit of priority to Korean Patent Application No. 10-2017-0150726, filed on Nov. 13, 2017, and Korean Patent Application No. 10-2018-0082241, filed on Jul. 16, 2018, the entire disclosures of which are incorporated herein by reference.

The present invention relates to a polyimide film for a flexible display device substrate, which has improved electrical insulation.

BACKGROUND OF THE INVENTION

Recent display devices have been focused on weight reduction and miniaturization thereof. For example, glass substrates used in the display devices have limits of being heavy and easily cracked difficult to be continuously processed, and have replaced with plastic substrates having advantages of being light, flexible and capable of continuous processing in devices such as mobile phones, notebook computers, PDAs, and the like.

In particular, polyimide (PI) resin is prepared by solution polymerization of dianhydride and diamine or diisocyanate to obtain a solution of polyamic acid derivative and coating the solution on a silicon wafer or glass, followed by heat curing. Such PI resin has advantages that it is easy to synthesize, it can be made in the form of a thin film and does not require a crosslinking group for curing.

Accordingly, many researches have tried to use the PI resin in a flexible plastic display board having light and flexible properties as integrated materials for semiconductors of LCD, PDP and the like according to the trends of recent electronic products, such as lightweight and refinement.

Furthermore, there is a need to develop a polyimide film for a flexible display substrate that can suppress the occurrence of current fluctuation in a TFT element in a display such as an OLED due to the long-term driving thereof, thereby reducing the contrast degradation of the display.

BRIEF SUMMARY OF THE INVENTION

It is an aspect of the present invention to provide a polyimide film having a high dielectric breakdown voltage.

It is other aspect of the present invention to provide a flexible display substrate prepared from the polyimide film.

In order to accomplish the above aspect, the present invention provides a polyimide film for a display substrate, which comprises internal voids having a maximum size of 10 nm or less and has a maximum dielectric breakdown voltage of 350 V/μm or more.

In one embodiment, the polyimide film may be prepared from polymeric components comprising a dianhydride of Formula 1 and diamines of Formulae 2 and 3:

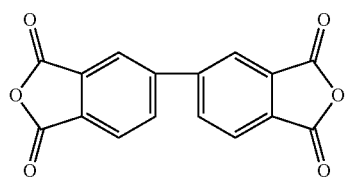

[Formula 1]

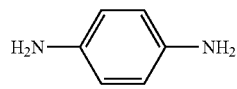

[Formula 2]

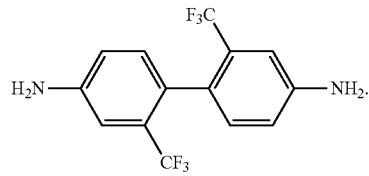

[Formula 3]

In one embodiment, the diamines of Formulae 2 and 3 may be comprised in a molar ratio of 80:20 to 95:5 in the polymeric components.

In one embodiment, the internal voids comprised in the polyimide film may have an average size of 1 nm to 5 nm.

In one embodiment, the internal voids comprised in the polyimide film may have a volume fraction of $1 \times 10^{-4}$ or less.

In one embodiment, the polyimide film may have a thermal decomposition temperature (Td 1%) of 560° C. or higher at which 1% of weight loss occurs.

In order to accomplish another aspect, the present invention further provides a display device comprising the polyimide film.

ADVANTAGEOUS EFFECTS

The present invention provides a polyimide film for a display substrate, which has a high heat resistance and a maximum dielectric breakdown voltage of 350 V/μm or more, thereby exhibiting substantially improved electrical insulation. The polyimide film having improved electrical insulation according to the present invention can suppress the occurrence of current fluctuation in a TFT element in a display such as an OLED due to the long-term driving thereof, thereby reducing the contrast degradation of the display.

BRIEF DESCRIPTION OF THE DRAWINGS

FIG. 1 shows a mechanism that breakdown voltage occurs through voids in a polyimide film.

FIG. 2 shows a treeing phenomenon caused by dielectric breakdown.

FIGS. 3a and 3b show an equipment for measuring breakdown voltage (BV) and the inside of the probe station, respectively.

FIG. 4 schematically shows a device for measuring breakdown voltage.

FIGS. 5a to 5e show the results of breakdown voltage measured from a device comprising each polyimide film of Examples and Comparative Examples.

FIGS. 6a to 6e show the results of measuring internal voids in each polyimide film of Examples and Comparative Examples using a small-angle X-ray scattering (SAXS) technique.

DETAILED DESCRIPTION OF THE INVENTION

Hereinafter, the present invention will be described in detail with reference to the accompanying drawings which illustrate a preferable example of the present invention for the purpose of better explanation, not intended to limit the technical scope of the invention. It will be obvious to those skilled in the art that various changes and modifications may be made without departing from the spirit and scope of the invention. In the following description, well-known functions or constructions would not be described in detail if they may obscure the point of the invention.

As used herein, all compounds or organic groups may be substituted or unsubstituted, unless otherwise specified. The term "substituted" means that at least one hydrogen contained in the compound or organic group is substituted with a halogen atom, an alkyl group having 1 to 10 carbon atoms, a halogenated alkyl group, a cycloalkyl group having 3 to 30 carbon atoms, an aryl group having 6 to 30 carbon atoms, an alkoxy group having 1 to 10 carbon atoms, a carboxyl group, an aldehyde group, an epoxy group, a cyano group, a nitro group, an amino group, and a derivative thereof.

The flexible display has been gradually growing because it has the advantages of a free-form factor, lightening, thin and not-broken characteristics. Also, such a flexible display is mainly manufactured using a polyimide consisting of BPDA-PDA having good heat-resistance as a substrate material.

However, when a display such as an OLED is used for a long time, its substrate material may undergo the increase of electric stress by electromagnetic field during long-term driving of a TFT element. From this, current fluctuation may occur in the TFT to cause the reduction of contrast.

In a conventional glass substrate, there is little current fluctuation according to the driving of the TFT since it has high insulating property. In contrast, a substrate material with low insulating property may undergo the degradation of its insulating property by such electric stress when it is driven for a long time. Accordingly, in the case that a polymer substrate is used as the plastic substrate of a flexible OLED, it needs to improve insulating property similar to the glass substrate.

When the polymer substrate is exposed as an insulator in an electric filed for a long time, its chemical and physical properties may be deteriorated to increase leakage current, thereby causing current fluctuation in the TFT.

Therefore, it is very important to obtain the electric insulation of the polymer substrate in the TFT element being driven for a long time. In order to improve the electrical insulation, the polymer insulator should have high dielectric breakdown voltage. The present inventors have made on many studies and found that the dielectric breakdown voltage of the polymer depends on voids present therein. The known plastic substrate for an OLED has been mainly made of a polyimide film consisting of 3,3',4,4'-biphenylcarboxylic dianhydride (s-BPDA) and 4,4'-paraphenylenediamine (p-PDA) to provide high heat-resistance. However, such polyimide film comprises voids having a size of 2 to 16 nm when measured using an SAXS technique, which may deteriorate dielectric breakdown voltage.

In order to solve such a problem of the known substrate, the present invention provide a polyimide film for a display substrate, which comprises internal voids having a maximum size of 10 nm or less and has a maximum dielectric breakdown voltage of 350 V/μm or more.

In one embodiment, the polyimide film may be prepared from polymeric components comprising a dianhydride of Formula 1 and diamines of Formulae 2 and 3:

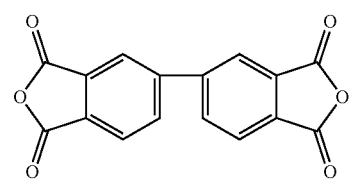

[Formula 1]

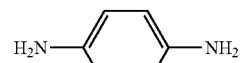

[Formula 2]

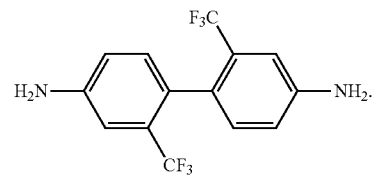

[Formula 3]

According to a preferred embodiment of the present invention, TFMB may be added to the polymeric components of BPDA and PDA in the preparation of a polyimide, thereby providing a polyimide film having surprisingly improved insulating property while maintaining high heat-resistance.

The polyimide film according to the present invention may have a maximum dielectric breakdown voltage of 350 v/μm or more, preferably 400 v/μm or more. This means that the maximum dielectric breakdown voltage is not measured in the region of less than 350 v/μm when measured more than 5 times in the same measurement method. The polyimide film according to the present invention has a maximum dielectric breakdown voltage of 350 V/μm or more in five or more measurements when the dielectric breakdown voltage is measured by the same method.

When an OLED is used for a long time, its substrate material may undergo the increase of electric stress by electromagnetic field during long-term driving of a TFT element. From this, current fluctuation may occur in the TFT to cause the reduction of contrast. Accordingly, in the case that the polymer substrate having a low dielectric breakdown voltage is exposed in an electric filed for a long time, its chemical and physical properties may be deteriorated to increase leakage current, thereby causing current fluctuation in the TFT and reducing the contrast of the display.

The polyimide film according to the present invention may have a high dielectric breakdown voltage to improve insulating property, thereby preventing the deterioration of a polyimide substrate even though it is exposed in the electromagnetic field during the long-term driving of the TFT. From this, the occurrence of leakage current by the deterioration of the substrate may be reduced and current fluctuation in the TFT may be suppressed.

The dielectric breakdown of the insulator may be accelerated by voids present in the material.

FIG. 1 shows a mechanism that breakdown voltage occurs through voids in a polyimide film. As shown in FIG. 1, when there are defects such as cracks or voids in the polyimide film being an insulator, further defects may be generated as an electric charge is subject to intercalation/deintercalation through the existing defects, thereby increasing leakage current and eventually causing breakdown in the defects. This may generate the treeing phenomenon as shown in FIG. 2, thereby causing the erosion of the insulator. Such a dielectric breakdown may deteriorate the electric insulating property and eventually cause the current fluctuation of the TFT and the deterioration of contrast.

Therefore, in order to reduce the dielectric breakdown of the polyimide film, i.e., improve the insulating property thereof, it is required to minimize of the size and volume fraction of voids present in the polyimide film.

The polyimide film of the present invention may comprise internal voids having an average size of 1 to 5 nm, preferably 2 to 4 nm.

In the polyimide film of the present invention, the internal voids may also have a maximum size of 10 nm or less, preferably 9 nm or less. That is, the polyimide film of the present invention has no internal voids having a size greater than 10 nm, thereby improving insulating property.

The size of the voids may depend on the degree of crystallization of the polymer and the number of non-crystalline regions. For example, the increased number of non-crystalline regions may raise the flexibility of the polymer chains during curing procedure at a high temperature, thereby controlling the size of the voids, but the present invention is not limited thereto.

Also, the internal voids comprised in the polyimide film may have a volume fraction of $1 \times 10^{-4}$ or less.

Thus, the present invention can decrease the size of the internal voids comprised in the polyimide film, thereby surprisingly reducing leakage current caused by defects due to the voids and eventually raising dielectric breakdown voltage, to provide remarkably improved insulating property to the polyimide film.

In one embodiment, the polyimide film may have a thermal decomposition temperature (Td 1%) of 560° C. or higher at which 1% of weight loss occurs.

In one embodiment, the polyimide film of the present may further comprise TFMB in addition to the structure of BPDA-PDA which is conventionally in the known polyimide film with high heat-resistance, thereby controlling the size of the internal voids to improve insulating property, while maintaining or enhancing high heat-resistance.

In one embodiment, the diamines of Formulae 2 and 3 may be comprised in a molar ratio of 80:20 to 95:5, preferably 85:15 to 90:10.

Also, the polyimide may further comprise another dianhydride in addition to the dianhydride of Formula 1. For example, a dianhydride containing a tetravalent organic group of Formulae 4a to 4d may be further comprised as polymeric components, but is not limited in the present invention:

[Formula 4a]

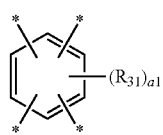

[Formula 4b]

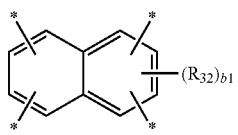

[Formula 4c]

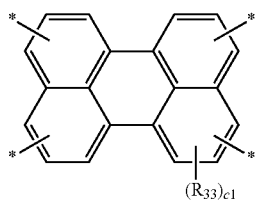

[Formula 4d]

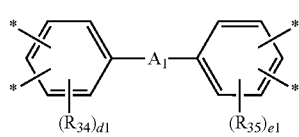

wherein, $R_{31}$ to $R_{35}$ are each independently $C_{1-10}$ alkyl group (e.g., a methyl, ethyl, propyl, isopropyl, t-butyl, pentyl or hexyl group), or $C_{1-10}$ fluoroalkyl group (e.g., a fluoromethyl, perfluoroethyl or trifluoromethyl group), $a_1$ is an integer of 0 to 2, $b_1$ is an integer of 0 to 4, $c_1$ is an integer of 0 to 8, and $d_1$ and $e_1$ are each independently an integer of 0 to 3, and $A_1$ is selected from the group consisting of a single bond, —O—, —$CR_{46}R_{47}$—, —C(=O)—, —C(=O)NH—, —S—, —$SO_2$—, penylene and a mixture thereof, in which $R_{46}$ and $R_{47}$ are each independently selected from the group consisting of hydrogen atom, $C_{1-10}$ alkyl group (e.g., a methyl, ethyl, propyl, isopropyl, t-butyl, pentyl or hexyl group), or $C_{1-10}$ fluoroalkyl group (e.g., a fluoromethyl, perfluoroethyl or trifluoromethyl group).

Also, a dianhydride containing a tetravalent organic group of Formulae 5a to 5t may be further comprised as polymeric components:

(5a)

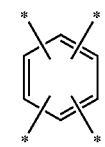

(5b)

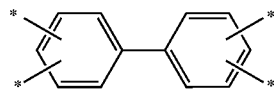

(5c)

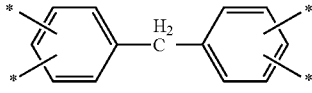

(5d)

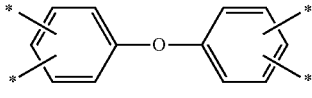

(5e)

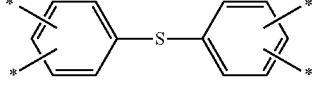

(5f)

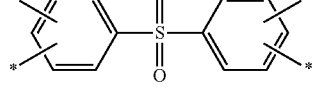

(5g)

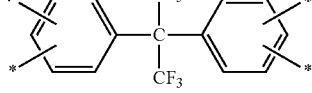

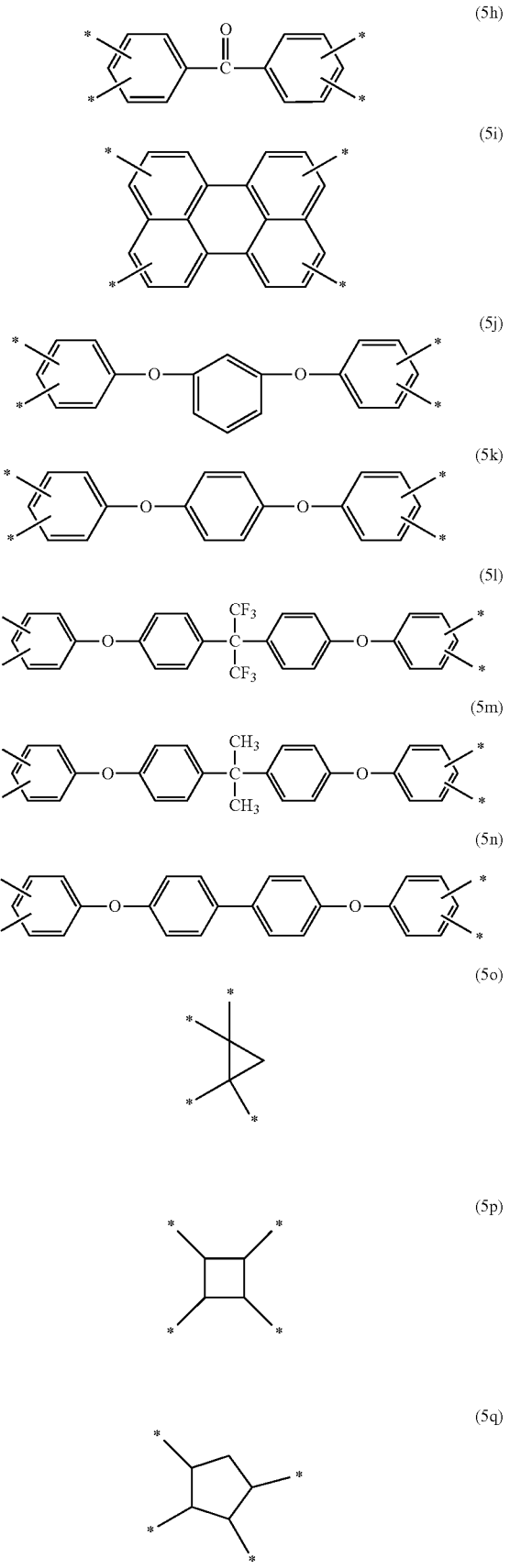

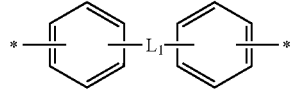

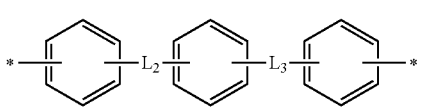

At least one hydrogen atom present in each of the tetravalent aromatic organic groups of Formulae 5a to 5t may also be substituted with a substituent of $C_{1-10}$ alkyl group (e.g., a methyl, ethyl, propyl, isopropyl, t-butyl, pentyl or hexyl group) or $C_{1-10}$ fluoroalkyl group (e.g., a fluoromethyl, perfluoroethyl or trifluoromethyl group).

Also, the polyimide may further comprise another diamine in addition to the diamine of Formulae 2 and 3. For example, a diamine containing a divalent organic group of Formulae 6a to 6d may be further comprised as polymeric components, but is not limited in the present invention:

[Formula 6a]

[Formula 6b]

wherein, $L_1$ is a single bond, —O—, —CO—, —S—, —SO$_2$—, —C(CH$_3$)$_2$—, —C(CF$_3$)$_2$—, —CONH—, —COO—, —(CH$_2$)$_{n_1}$-, —O(CH$_2$)$_{n_2}$O—, —OCH$_2$—C(CH$_3$)$_2$—CH$_2$O— or —COO(CH$_2$)$_{n_3}$OCO—, in which $n_1$, $n_2$ and $n_3$ are each an integer of 1 to 10.

[Formula 6c]

wherein, $L_2$ and $L_3$ are same or different with each other, and are each a single bond, —O—, —CO—, —S—, —SO$_2$—, —C(CH$_3$)$_2$—, —C(CF$_3$)$_2$—, —CONH—, —COO—, —(CH$_2$)$_{n_1}$—, —O(CH$_2$)$_{n_2}$—, —OCH$_2$—C(CH$_3$)$_2$—CH$_2$O— or —COO(CH$_2$)$_{n_3}$OCO—, in which $n_1$, $n_2$ and $n_3$ are each an integer of 1 to 10.

[Formula 6d]

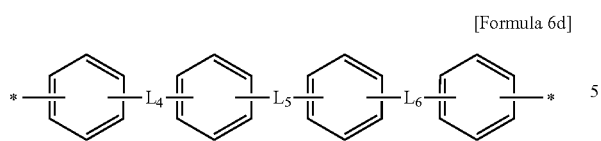

wherein, $L_4$, $L_5$ and $L_6$ are same or different with each other, and are each a single bond, —O—, —CO—, —S—, —SO₂—, —C(CH₃)₂—, —C(CF₃)₂—, —CONH—, —COO—, —(CH₂)n₁—, —O(CH₂)n₂O—, —OCH₂—C(CH₃)₂—CH₂O— or —COO(CH₂)n₃OCO—, in which $n_1$, $n_2$ and $n_3$ are each an integer of 1 to 10.

Also, a diamine containing a divalent organic group selected from the group consisting of the following Formulae 7a to 7p may be further comprised as polymeric components:

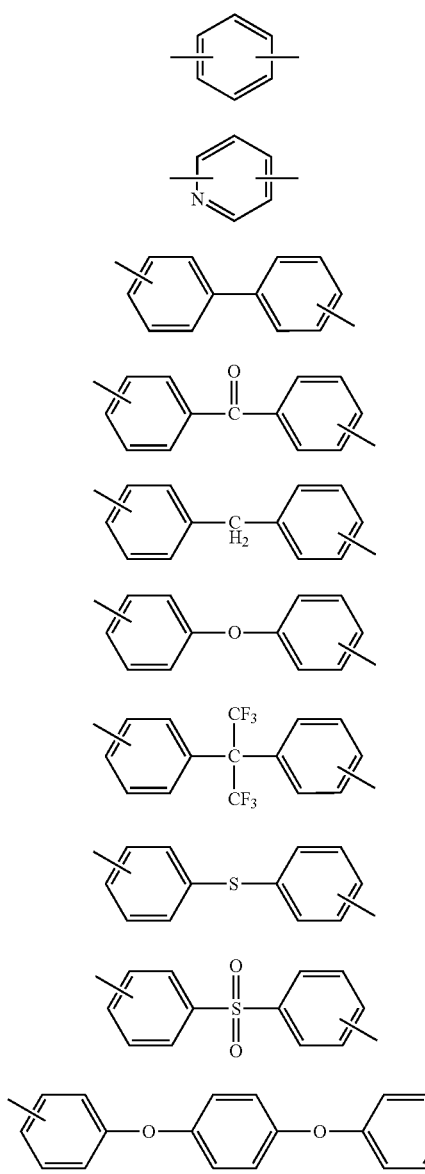

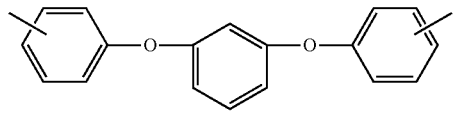

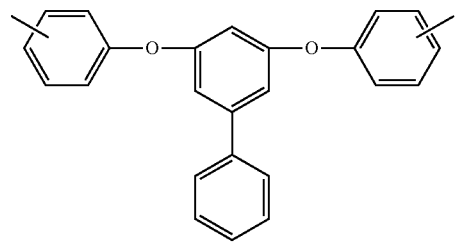

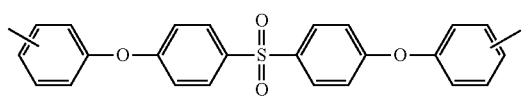

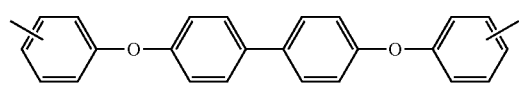

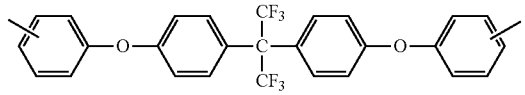

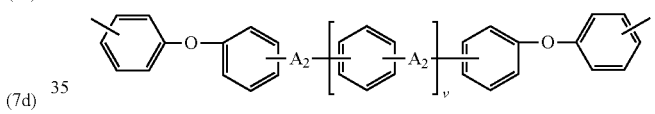

wherein, $A_2$ is selected from the group consisting of a single bond, —O—, —C(=O)—, C(=O)NH—, —S—, —SO₂—, phenylene and a mixture thereof, and v is an integer of 0 or 1.

Also, at least one hydrogen atom present in each of the divalent aromatic organic groups of Formulae 7a to 7p may also be substituted with a substituent selected from the group consisting of $C_{1-10}$ alkyl (e.g., a methyl, ethyl, propyl, isopropyl, t-butyl, pentyl or hexyl group), $C_{1-10}$ fluoroalkyl (e.g., a fluoromethyl, perfluoroethyl or trifluoromethyl group), $C_{6-12}$ aryl (e.g., phenyl or naphthyl), hydroxyl and carboxyl groups.

The dianhydride and the diamine may be subject to reaction in a ratio of 98.7:100 to 100:98.7, preferably 98.9:100 to 100:98.9.

The polymerization of the dianhydride and the diamine may be carried out by conventional polymerization methods of a polyimide or its precursor, such as solution polymerization.

The reaction of polymerization may be carried out under anhydrous conditions at a temperature of −75 to 50° C., preferably 0 to 40° C. The diamine compound is dissolved in an organic solvent, to which an acid dianhydride is added. The diamine compound and the dianhydride is contained in an amount of about 10 to 30 wt % in the polymerization solvent, and their molecular weight may be controlled according to the polymerization time and reaction temperature.

Also, the solvent which may be used in the polymerization may be selected from the group consisting ketones such as γ-butyrolactone, 1,3-dimethyl-imidazolidinone, methyl ethyl ketone, cyclohexanone, cyclopentanone, and 4-hydroxy-4-methyl-2-pentanone; aromatic hydrocarbons such as toluene, xylene, and tetramethylbenzene; glycol ethers (Cellosolve) such as ethylene glycol monoethylether, ethylene glycol monomethyl ether, ethylene glycol monobutyl ether, diethylene glycol monoethyl ether, diethylene glycol monomethyl ether, diethylene glycol monobutyl ether, propylene glycol monomethyl ether, propylene glycol monoethyl ether, dipropylene glycol diethyl ether, and triethylene glycol monoethyl ether; ethyl acetate, butyl acetate, ethylene glycol monoethyl etheracetate, ethylene glycol monobutyl etheracetate, diethylene glycol monoethyl etheracetate, dipropylene glycol monomethyl etheracetate, ethanol, propanol, ethyleneglycol, propyleneglycol, carbitol, dimethylacetamide (DMAc), N,N-diethylacetamide, dimethylformamide (DMF), diethylformamide (DEF), N,N-dimethylacetamide (DMAc), N-methyl pyrrolidone (NMP), N-ethylpyrrolidone (NEP), N-vinylpyrrolidone, 1,3-dimethyl-2-imidazolydinone, N,N-dimethylmethoxy acetamide, dimethylsulfoxide, pyridine, dimethylsulfone, hexamethyl phosphoamide, tetramethyl urea, N-methyl caprolactam, tetrahyrofuran, m-dioxane, p-dioxane, 1,2-dimethoxyethane, bis(2-methoxyethyl)ether, 1,2-bis (2-methoxyethoxy)ethane, bis[2- (2-methoxyethoxy)]ether, dimethyl propionamide, diethyl propionamide and a mixture thereof.

Preferably, sulfoxide-based solvents such as dimethylsulfoxide, diethylsulfoxide and the like; formamide-based solvents such as N,N-dimethylformamide, N,N-diethylformamide and the like; acetamide-based solvents such as N,N-dimethylacetamide, N,N-diethylacetamide and the like; pyrrolidone-based solvents such as N-methyl-2-pyrrolidone, N-vinyl-2-pyrrolidone and the like may be used alone or in a mixture thereof, but not limited thereto. Also, aromatic hydrocarbons such as toluene may be further used. Furthermore, in order to facilitate the dissolution of the polymer, an alkali metal salt or alkaline earth metal salt may be further added to the solvent in an amount of about 50 wt % or less based on the total weight of the solvent.

The polyimide precursor obtained by the above method may be coated on one surface of a substrate, followed by imidization, curing and separation from the substrate, to prepare a polyimide film.

Specifically, the polyimide precursor composition may be in the form of a solution that the polyimide precursor is dissolved in an organic solvent. For example, in the case that the polyimide precursor is synthesized in an organic solvent, the polyimide precursor composition may be the polyimide precursor solution itself obtained after polymerization, may be further added with the same solution, or may be diluted with another solvent after polymerization.

The polyimide precursor composition preferably comprises a solid component in a content to provide a suitable viscosity in consideration of processability such as coating property in a film forming process. The solid content may range from 5 to 20 wt % based on the total weight of the polyimide precursor composition. It is preferred that the polyimide precursor composition has a viscosity of 400 to 50,000 cPs. Also, the viscosity of the polyimide precursor composition may be less than 400 cPs. If the viscosity of the polyimide precursor composition exceeds 50,000 cPs, the flexibility thereof decreases, making it difficult to be uniformly coated on the substrate and causing the process problems in the preparation of a display substrate. Then, the polyimide precursor composition is coated on one surface of the substrate, and subject to imidization and curing at a temperature of 80 to 400° C., followed by separation from the substrate to prepare a polyimide film.

The substrate may be glass, a metallic substrate or a plastic substrate, but is not particularly limited thereto. Among these, glass may be preferably used in terms that it has good thermal and chemical stability during the imidization and curing of the polyimide precursor and it can be easily separated from the polyimide film obtained after curing without any damage.

The coating procedure may be carried out by conventional methods, specifically spin coating, bar coating, roll coating, air-knife coating, gravure coating, reverse roll coating, kiss-roll coating, doctor blade coating, spraying coating, dipping coating or brushing. Particularly, casting may be preferable in terms that it allows continuous processes and can increase the imidization rate of the polyimide film.

Also, the polyimide precursor composition may be coated in a thickness so that the final polyimide film can have a thickness suitable for a display substrate.

Specifically, it may be coated in an amount that the final polyimide film can have a thickness of 10 to 30 μm. After coating the polyimide precursor composition, prior to heat-treatment, a process of drying may be selectively carried out to remove the solvent remained in the polyimide precursor composition.

The process of drying may be carried out by conventional methods, specifically at a temperature of 140° C. or less, or 80° C. to 140° C. The drying temperature of lower than 80° C. may increase the process time, and the drying temperature of higher than 140° C. may induce sudden imidization, making it difficult to obtain the uniform thickness of the polyimide film.

Subsequently, the curing may be carried out by heat treatment at a temperature of 80 to 400° C. , or 120 to 450° C. The curing may be carried out by heat treatment in multiple stages at the above temperature range. The curing time is not particularly limited, for example, it may range from 3 to 60 minutes.

After curing, the polyimide film may be further subject to additional heat treatment to increase the imidization rate of the polyimide, thereby providing the above-mentioned properties.

Then, the polyimide film formed on the substrate may be detached from the substrate by conventional methods to prepare the polyimide film.

The present invention further provides a flexible display substrate comprising the polyimide film. The flexible display substrate comprising the polyimide film has high heat-resistance as well as high dielectric breakdown voltage, thereby exhibiting substantially improved electrical insulation to suppress the dielectric breakdown due to the long-term exposure in the electric field and the occurrence of current fluctuation in a TFT element due to leakage current generated by the dielectric breakdown, thereby reducing the contrast degradation. Accordingly, a display having more improved properties and reliability can be provided.

Accordingly, the polyimide can be effectively used in the preparation of a flexible display applied in electronic devices such as an OLED, an LCD, an electronic paper or a solar cell, particularly as a substrate for displays such as an OLED.

Hereinafter, the present invention will be described in more detail with reference to Examples. It will be apparent to those skilled in the art that the following examples are intended to be illustrative of the present invention and not to be construed as limiting the scope of the invention.

Example 1: Polymerization of BPDA-pPDA-TFMB (98.9:90:10) Polyimide

A reactor subjected to nitrogen gas flow was filled with 100 g of organic solvent, N-methylpyrrolidone (NMP), and then 5.335 g (49.332 mmol) of p-phenylene diamine (p-PDA) and 1.775 g (5.481 mmol) of bis(trifluoromethyl) benzidine (TFMB) were dissolved therein while maintaining the temperature of the reactor at 25° C. To the solution of p-PDA and TFMB, 15.950 g (54.221 mmol) of 3,3',4,4'-biphenylcarboxylic dianhydride (s-BPDA) and 56.96 g of NMP were added at the same temperature, and dissolved with stirring for a predetermined period of time to conduct the polymerization of a polyamic acid, thereby obtaining a polyimide precursor.

The organic solvent was added to the polyimide precursor obtained above so that its solid content was 12.8 wt %, thereby preparing a polyimide precursor solution.

The polyimide precursor solution was spin coated onto a glass substrate. The polyimide precursor solution-coated glass substrate was put in an oven and subject to heating at a rate of 6° C./min, followed by curing at 120° C. for 10 minutes and 450° C. for 20 minutes. After curing, the glass substrate was dipped in water, and the film formed on the substrate was detached and dried at 100° C. in an oven, to prepare a 10 μm-thick polyimide film.

Also, a polyimide film having a thickness of 1 μm was formed on an ITO-coated glass substrate by using the polyimide precursor solution and the same curing procedure.

Comparative Example 1: Polymerization of BPDA-pPDA (100:98.9) Polyimide

A reactor subjected to nitrogen gas flow was filled with 100 g of organic solvent, N-methylpyrrolidone (NMP), and then 6.142 g (56.800 mmol) of p-phenylene diamine (p-PDA) was dissolved therein while maintaining the temperature of the reactor at 25° C. To the solution of p-PDA, 16.898 g (57.432 mmol) of 3,3',4,4'-biphenylcarboxylic dianhydride (s-BPDA) and 56.96 g of NMP were added at the same temperature, and dissolved with stirring for a predetermined period of time to conduct the polymerization of a polyamic acid, thereby obtaining a polyimide precursor.

The organic solvent was added to the polyimide precursor obtained above so that its solid content was 12.8 wt %, thereby preparing a polyimide precursor solution.

The polyimide precursor solution was spin coated onto a glass substrate. The polyimide precursor solution-coated glass substrate was put in an oven and subject to heating at a rate of 6° C./min, followed by curing at 120° C. for 10 minutes and 450° C. for 20 minutes. After curing, the glass substrate was dipped in water, and the film formed on the substrate was detached and dried at 100° C. in an oven, to prepare a 10 μm-thick polyimide film.

Also, a polyimide film having a thickness of 1 μm was formed on an ITO-coated glass substrate by using the polyimide precursor solution and the same curing procedure.

Comparative Example 2: Polymerization of BPDA-pPDA (98.9:100) Polyimide

A reactor subjected to nitrogen gas flow was filled with 100 g of organic solvent, N-methylpyrrolidone (NMP), and then 6.243 g (57.726 mmol) of p-phenylene diamine (p-PDA) was dissolved therein while maintaining the temperature of the reactor at 25° C. To the solution of p-PDA, 16.797 g (57.091 mmol) of 3,3',4,4'-biphenylcarboxylic dianhydride (s-BPDA) and 56.96 g of NMP were added at the same temperature, and dissolved with stirring for a predetermined period of time to conduct the polymerization of a polyamic acid, thereby obtaining a polyimide precursor.

The polyimide precursor obtained above was added with the organic solvent so that its solid content was 12.8 wt %, thereby preparing a polyimide precursor solution.

The polyimide precursor solution was spin coated onto a glass substrate. The polyimide precursor solution-coated glass substrate was put in an oven and subject to heating at a rate of 6° C./min, followed by curing at 120° C. for 10 minutes and 450° C. for 20 minutes. After curing, the glass substrate was dipped in water, and the film formed on the substrate was detached and dried at 100° C. in an oven, to prepare a 10 μm-thick polyimide film.

Also, a polyimide film having a thickness of 1 μm was formed on an ITO-coated glass substrate by using the polyimide precursor solution and the same curing procedure.

Comparative Example 3: Polymerization of BPDA-pPDA-ODA (98.9:90:10) Polyimide A reactor subjected to nitrogen gas flow was filled with 100 g of organic solvent, N-methylpyrrolidone (NMP), and then 5.492 g (50.782 mmol) of p-phenylene diamine (p-PDA) and 1.130 g (5.481 mmol) of 4,4'-oxydianiline (ODA) were dissolved therein while maintaining the temperature of the reactor to 25° C. To the solution of p-PDA and ODA, 16.419 g (55.804 mmol) of 3,3',4,4' -biphenylcarboxylic dianhydride (s-BPDA) and 56.96 g of NMP were added at the same temperature, and dissolved with stirring for a predetermined period of time to conduct the polymerization of a polyamic acid, thereby obtaining a polyimide precursor.

The polyimide precursor obtained above was added with the organic solvent so that its solid content was 12.8 wt %, thereby preparing a polyimide precursor solution.

The polyimide precursor solution was spin coated onto a glass substrate. The polyimide precursor solution-coated glass substrate was put in an oven and subject to heating at a rate of 6° C./min, followed by curing at 120° C. for 10 minutes and 450° C. for 20 minutes. After curing, the glass substrate was dipped in water, and the film formed on the substrate was detached and dried at 100° C. in an oven, to prepare a 10 μm-thick polyimide film.

Also, a polyimide film having a thickness of 1 μm was formed on an ITO-coated glass substrate by using the polyimide precursor solution and the same curing procedure.

Comparative Example 4: Polymerization of PMDA-TFMB (98.9:100) Polyimide

A reactor subjected to nitrogen gas flow was filled with 100 g of organic solvent, N-methylpyrrolidone (NMP), and then 13.766 g (42.989 mmol) of bis(trifluoromethyl)benzidine (TFMB) was dissolved therein while maintaining the temperature of the reactor at 25° C. To the solution of TFMB, 9.274 g (42.516 mmol) of pyromellitic dianhydride (PMDA) and 56.96 g of NMP were added at the same temperature, and dissolved with stirring for a predetermined period of time to conduct the polymerization of a polyamic acid, thereby obtaining a polyimide precursor.

The polyimide precursor obtained above was added with the organic solvent so that its solid content was 12.8 wt %, thereby preparing a polyimide precursor solution.

The polyimide precursor solution was spin coated onto a glass substrate. The polyimide precursor solution-coated glass substrate was put in an oven and subject to heating at a rate of 6° C./min, followed by curing at 120° C. for 10 minutes and 450° C. for 20 minutes. After curing, the glass substrate was dipped in water, and the film formed on the substrate was detached and dried at 100° C. in an oven, to prepare a 10 μm-thick polyimide film.

Also, a polyimide film having a thickness of 1 μm was formed on an ITO-coated glass substrate by using the polyimide precursor solution and the same curing procedure.

Experimental Example 1

The polyimide films prepared in Example 1 and Comparative Examples 1 to 4 were measured for dielectric breakdown voltage using high voltage source measurement (4210, Keithley) shown in FIGS. 3a and 3b under the following conditions:
Source voltage range: ±200 mV to ±1 kV
Resistance measurement range: 0.2 to 200 MΩ
I-V Resolution Min.: 10 pA The polyimide films prepared in Example 1 and Comparative Examples 1 to 4 were used to prepare a device for measuring breakdown voltage (BV) shown in FIG. 4, in which top electrode (gold electrode) was formed in the circular shape having a diameter of 2 mm by way of sputtering.

The measurement was performed five times while transferring the top electrode (gold electrode) in the device. In the measurement of the device, a part of the polyimide film coated on the ITO was peeled off for contact with a probe, and another probe was brought into contact with the top electrode to measure BY.

The measurement conditions were shown in Table 1, and the results of the measured BV were shown in FIGS. 5a to 5e.

TABLE 1

| Measurement Conditions | |
| --- | --- |
| Voltage source range | 0 V-1 kV |
| Delay time | 200 ms |
| Numbers of Measurements | 5 times |
| Temperature of Measurements | room temperature |

As shown in FIGS. 5a to 5e, the device using the polyimide film of the present invention as a substrate exhibited a maximum dielectric breakdown voltage ranging from 369 to 440 V/μm, which there was no value less than 350 V/μm on 5 measurements. In contrast, the devices using the polyimide films containing 2- or 3-components without TFMB of Comparative Examples 1 to 3 and the polyimide films without BPDA of Comparative Example 4 exhibited a maximum dielectric breakdown voltage in the region of 350 V/μm or less and also in the region even less than 300 V/μm on 5 measurements, which were uneven results depending on the part and the repeated numbers of the measurements.

Experimental Example 2

The polyimide films prepared in Example 1 and Comparative Examples 1 to 4 were measured for their internal voids using a small-angle X-ray scattering (SAXS) technique. The measurement was performed using a μ-SAXS beam-line 9A (Pohang Light Source). The film samples were attached to a sample holder using a transparent tape. The 2D images obtained in the experiments were averaged in a circle based on a beam stop and converted into a 1D image. The intensity values of the experimental data were converted to absolute values ($cm^{-1}$). Two sets of data per sample were merged by the NIST SANS data reduction package using 6.5 m and 2.5 m SDDs at 19.95 keV energy. The volume fraction was measured according to the procedure described in T. P. Russell, Concerning Voids in Polyimide, Polymer Engineering and Science, Mid-April, 1984, Vol. 24, No. 5.

The measurement conditions were shown in FIGS. 6a to 6e and Table 2. FIG. 6a shows the results of three measurements on the film of Example 1.

TABLE 2

| | $R_c$ or $R_1$ (nm) | $R_2$ (nm) | $R_3$ (nm) | Volume Fraction |
| --- | --- | --- | --- | --- |
| Example 1 (FIG. 6a) | 3.2 | No | No | 8.7E−05 |
| Com. Example 1 (FIG. 6b) | 2.0 | 16.0 | No | 8.1E−05 |
| Com. Example 2 (FIG. 6c) | 2.4 | 16.2 | No | 9.2E−05 |
| Com. Example 3 (FIG. 6d) | 2.5 | 15.7 | 100.1 | 8.1E−05 |
| Com. Example 4 (FIG. 6e) | 2.3 | No | 94.2 | 1.2E−04 |

As shown in FIGS. 6a to 6e and Table 2, the polyimide films of Comparative Examples 1 to 3 had voids having a maximum size of about 16 nm, while the polyimide film of the present invention significantly had voids having a very small size (Rc 3.2 nm), although the volume fractions of voids were similar. Comparative Example 4 corresponded to the transparent polyimide having a typical structure, in which the increase of the fluorine-based substituent remarkably enlarged free volume to raise volume fraction with respect to the voids. The high volume fraction may cause the internal discharge by the voids to increase leakage current.

Thus, when the voids have a smaller size although being similar in the volume fraction thereof, or when the void have a smaller size and a decreased volume fraction, the increase of defects and leakage current can be suppressed to improve insulating property.

Experimental Example 3: Measurement of Thermal Decomposition Temperature (TD1%)

Each polyimide film was measured for its thermal decomposition temperature (TD1%) at which 1% of weight loss occurs, under nitrogen atmosphere according to ISO 11359 using Discovery TGA (TA instruments). The results thereof are as follows.

| | Thermal Decomposition Temperature (Td1 %, ° C.) |
| --- | --- |
| Example 1 | 561 |
| Com. Example 1 | 552 |
| Com. Example 2 | 560 |
| Com. Example 3 | 547 |
| Com. Example 4 | 541 |

While the present invention has been particularly shown and described with reference to figures and embodiments thereof, it will be understood by those of ordinary skill in the art that the scope of the present invention is not limited thereby and that various changes and modifications may be made therein. Therefore, the actual scope of the present invention will be defined by the appended claims and their equivalents.

What is claimed is:

1. A polyimide film for a display substrate, which comprises intenal voids having a maximum size of 10 nm or less and has a maximum dielectric breakdown voltage of 350 V/μm or more, wherein the polyimide is a polymerization product of polymeric components comprising a dianhydride of Formula 1 and diamines of Formulae 2 and 3:

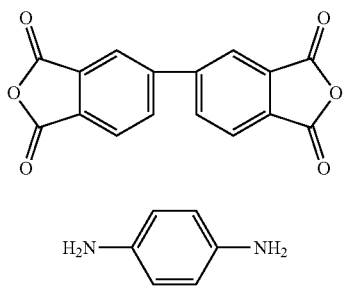

[Formula 1]

[Formula 2]

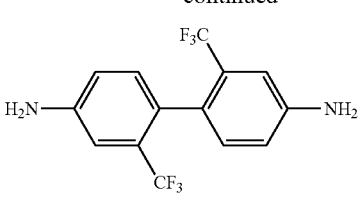

[Formula 3]

wherein the diamines of Formulae 2 and 3 are comprised in a molar ratio of 85:15 to 95:5 in the polymeric components.

2. The polyimide film for a display substrate of claim 1, wherein the diamines of Formulae 2 and 3 are comprised in a molar ratio of 85:15 to 90:10 in the polymeric components.

3. The polyimide film for a display substrate of claim 1, wherein the internal voids comprised in the polyimide film have an average size of 1 nm to 5 nm.

4. The polyimide film for a display substrate of claim 1, wherein the internal voids comprised in the polyimide film have a volume fraction of $1 \times 10^{-4}$ or less.

5. The polyimide film for a display substrate of claim 1, which has a thermal decomposition temperature (Td 1%) of 560° C. or higher at which 1% of weight loss occurs.

6. A display substrate comprising the polyimide film of claims 1.

* * * * *